March 28, 1950    L. D. ALWARD    2,501,984
SHAFT SEAL
Filed Aug. 6, 1947
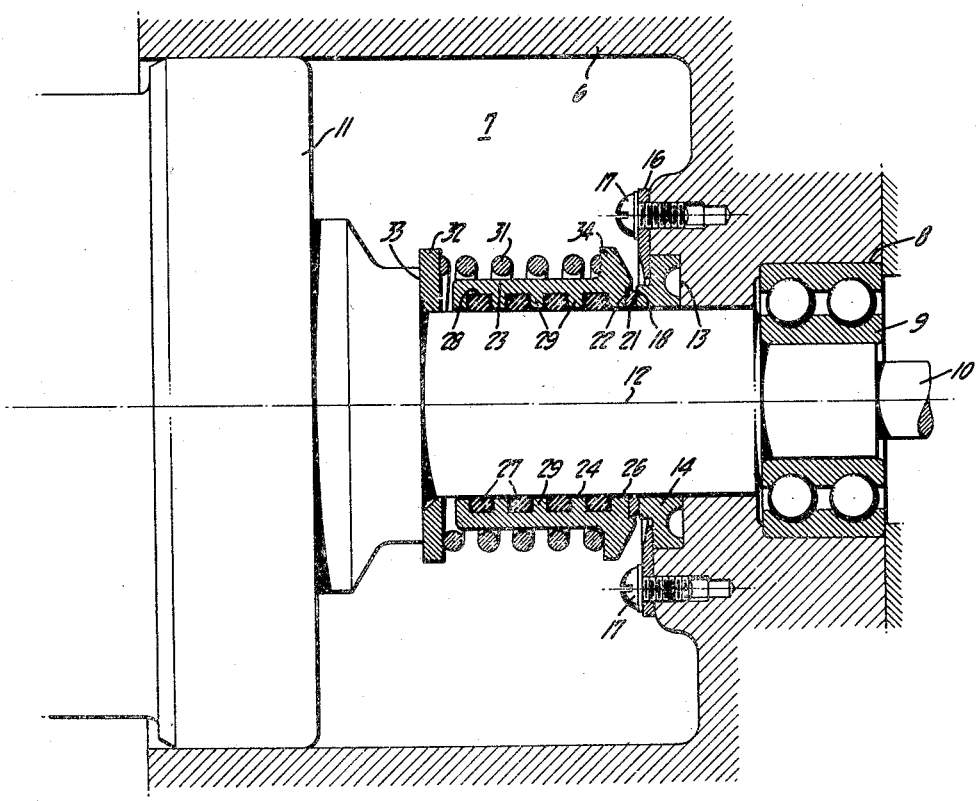
FIG_1_
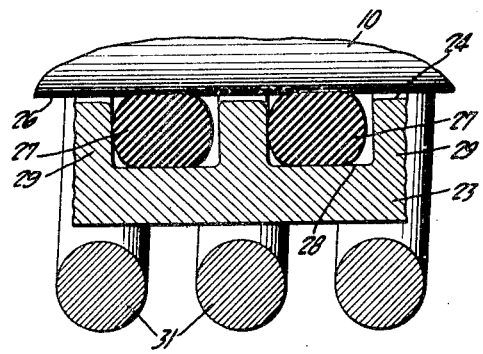
FIG_2_
INVENTOR.
Leroy D. Alward
BY *Marcus Lothrop*

Patented Mar. 28, 1950

2,501,984

UNITED STATES PATENT OFFICE 2,501,984

SHAFT SEAL

Leroy D. Alward, Albany, Calif., assignor to The Pelton Water Wheel Company, San Francisco, Calif., a corporation of California Application August 6, 1947, Serial No. 766,752

5 Claims. (Cl. 286—11.15)

1

My invention relates to means for preventing leakage into or from a chamber at a pressure the same as or different from atmospheric, particularly along a shaft which passes through the chamber wall.

There are many instances in mechanics in which a rotating member such as a shaft must be sealed with respect to air or liquid leakage where it passes through a relatively stationary wall such as a casing. It is important not only that an effective seal be made, but that the rotational property be unrestricted so that undue friction does not develop. Furthermore, it is advisable that allowance be made for errors and discrepancies in manufacture and deviations developing in operation since various minor irregularities have been found to cause serious deficiencies in some otherwise satisfactory sealing devices. It is also advisable to have a structure relatively easy and economical to manufacture and with a relatively long life so as to require replacement only infrequently. The seal should be axially flexible to move freely as temperature changes expand or contract the shaft or as pressure changes expand or contract the casing in an axial direction.

It is to accomplish these various ends and to provide an improved shaft seal that I have made my present invention. Other objects, together with the foregoing, are attained in my shaft seal one form of which is shown in the accompanying drawing in which:

Figure 1 is a cross section on a transverse axial plane of a shaft seal constructed in accordance with my invention and disposed in a typical environment.

Figure 2 is a fragmentary view similar to Figure 1 but showing a portion of my shaft seal to an enlarged scale.

While the environment in which my shaft seal is utilized may vary substantially, in a typical instance it is utilized in connection with a casing 6 or housing on one side exposed to the atmosphere and on the other side defining a chamber 7 in which the pressure is the same as or different from atmospheric. In the present instance it is assumed that the pressure within the chamber 7 is above atmospheric pressure. The casing 6 is contoured to provide a seat 8 for an anti-friction bearing 9 constituting a journal support for a relatively rotating member 10 such as a shaft. The shaft is provided with additional bearing support 11 within the housing 6 and rotates with respect to the housing about an axis 12.

In accordance with the invention, the housing 6 is provided with a counterbore 13 in which a seal seat or wearing ring 14 is disposed. An annulus 16 preferably confines the seat 14 against axial and rotational movement and is held in position by removable fastenings 17 engaging the housing 6. The seat 14 does not quite touch the shaft 12. It is provided with a planar outer face 18 disposed substantially perpendicular to the axis 12 thus constituting a transverse contacting area. Due to slight inaccuracies in manufacture, or in the bearing 9, or due to deflections during operation it may be that the planar surface is itself disposed not quite perpendicular to the axis 12 although a substantial perpendicularity is illustrated.

To cooperate with the surface 18 there is provided a suitable anti-friction surface 21 on the exposed area of an anti-friction insert 22 at one end of a spool 23. The surface 21 is machined to match as closely as possible the surface 18. Since it moves or rotates relative thereto the anti-friction material reduces the drag substantially. In order that the surfaces 21 and 18 can contact accurately, despite inaccuracies in manufacture or in operation, the spool 23 although encompassing the shaft 10 does not in any way abut or contact or touch the shaft. Rather, it is of a size so that a clearance 24 of substantial magnitude exists between the spool and the shaft.

To support the spool in a position spaced from but nevertheless substantially co-axial with the shaft, I interpose between the spool and an exterior circular cylindrical portion 26 of the shaft one or more rings 27. Each of the rings is preferably fabricated of a resilient or deformable or elastic material unaffected by any lubricant or gas which may be within the chamber 7 and which does not, over a period of time, have any tendency to cement itself either to the shaft or to the spool. A suitable substance is rubber, either natural or synthetic, or a comparable plastic. In its normal, free state, the ring 27 is a circle in cross section and is annular in form being a torus in configuration. It is, however, of slightly smaller interior diameter than the cylindrical portion 26 of the shaft 10. When it is slipped upon the shaft, the ring is deformed or distorted substantially as shown in Figure 2 to have a relatively large area of contact with the shaft. Due to its elasticity, the ring grips the shaft tightly enough so that the ring frictionally turns with the shaft, being effective to transmit a substantial amount of rotational power or force.

Preferably a plurality of the rings 27 are disposed around the shaft 10 and are also confined within an interior cylindrical surface 28 within the spool. The surface 28 is of an internal diameter somewhat less than the free external diameter of the rings 27. In this way the rings are also exteriorly deformed to transmit a substantial rotational force to or from the spool. Thus the spool is carried or supported by the shaft through the rings only. The axis of the spool, while normally coincident with the axis 12, is freely displaceable within relative wide limits either way from the axis 12 or can be tilted or cocked with respect to such axis. Hence the body of the spool occupies a position determined by the abutment of the surfaces 18 and 21 and not by the external surface 26 of the shaft 10. The frictional engagement of the rings is such that normally the spool turns in unison with the shaft 10, although a severe overload causes slippage rather than breakage.

To confine the rings axially, the surface 28 is interrupted periodically and internal grooves are defined by internal flanges 29 extending radially inwardly of the spool but stopping short of abutment with the shaft to leave substantial clearance. The axial width of each groove is greater than that of its ring to provide some axial freedom by rolling rather than sliding of the ring.

In order that the surfaces 18 and 21 will be held in abutment with appropriate pressure to maintain a seal between the chamber 7 and the surrounding atmosphere to supplement the internal pressure and even though the external pressure may be somewhat higher, I provide a coil spring 31. This encompasses the spool, at one end abutting a washer 32 forced against a shoulder 33 on the shaft 10 and at the other end abutting a shoulder 34 extending around the periphery of the spool. When the pressure in the chamber is greater than outside, it assists the spring in urging the surfaces 18 and 21 together, while when the outside pressure is equal or greater the spring resists it to the limit of its ability and still urges the surfaces 18 and 21 together.

The deformability and frictional characteristics of the rings 28 are such that the surfaces 18 and 21 can be moved axially apart by temperature variations in the shaft, by chamber pressure changes, by external force on the spring 31 and other ways, thus avoiding seizing and damage. The spool, in normal operation is urged axially along the shaft toward the exterior by the expansion of the spring 31 assisted by favorable chamber pressure so that the desired frictional load is imposed upon the surfaces 18 and 21 to preclude substantial leakage therebetween. As part of the axial spool motion to accommodate minor irregularities, the rings 27 or at least the upstream ring 27, are urged by the difference between chamber and exterior pressure to crowd tightly against the downstream wall of the flanges 29, thus blocking flow. The only other path for leakage from the interior to the exterior or vice versa is between the shaft 10 and the spool and this leakage path is also completely closed or blocked or sealed by the deformable ring or rings 27. Thus a low friction, tightly contacting, yieldably mounted and axially flexible seal is provided.

I claim:

1. A shaft seal comprising a fixed member, a rotary member, said fixed member having a transverse planar face, a spool encompassing and spaced from said rotary member with substantial radial clearance therebetween and having a transverse planar face, a spring engaging said rotary member and said spool for urging said planar faces into abutment, and a plurality of axially spaced deformable rings between and in contact with said rotary member and said spool for frictionally transmitting rotational force therebetween.

2. A shaft seal comprising a fixed member having a transverse planar face, a rotary member disposed to rotate about an axis perpendicular to said planar face and having an exterior cylindrical surface, a plurality of deformable axially spaced resilient rings frictionally gripping said surface, a spool encompassing and spaced from said rotary member with substantial radial clearance therebetween and having an interior cylindrical surface frictionally gripping said rings, said spool being supported on said rotary member solely by said rings and having a transverse planar face, and a spring for urging said spool axially of said rotary member with said planar faces in abutment.

3. A shaft seal comprising a fixed member having a bearing face thereon, a relatively rotating shaft adjacent said fixed member, a cylindrical spool encompassing but spaced from said shaft, said spool having a face adapted to abut said bearing face and having a plurality of internal flanges defining a plurality of axially spaced internal grooves, means for pressing said spool toward said fixed member with said faces in abutment, and a plurality of resilient rings in tight radial engagement with said shaft and said spool and each disposed with axial space in one of said grooves.

4. A shaft seal comprising: a fixed member, a rotary shaft journalled thereon, said fixed member having a transverse planar face surrounding said shaft, a generaly cylindrical spool having an axial bore surrounding said shaft with substantial radial clearance therebetween, said spool having a transverse planar face at one end thereof and a plurality of axially spaced, inwardly facing annular grooves in said bore, a deformable ring in each groove held under radial compression between said spool and said shaft, and resilient means urging said spool axially of said shaft to hold said planar faces in pressure contact.

5. A shaft seal as defined in claim 3 wherein said deformable rings are normally of toric configuration and wherein the axial width of each of said grooves is greater than the corresponding dimension of the radially compressed rings therein.

LEROY D. ALWARD.

REFERENCES CITED

The following references are of record in the file of this patent:

UNITED STATES PATENTS

| Number | Name | Date |
|---|---|---|
| 750,090 | Coleman | Jan. 19, 1904 |
| 2,148,093 | Wheeler | Feb. 21, 1939 |
| 2,411,509 | Endebak | Nov. 26, 1946 |
| 2,429,953 | Bottomley | Oct. 28, 1947 |

FOREIGN PATENTS

| Number | Country | Date |
|---|---|---|
| 16,170 | Australia | of 1928 |